United States Patent [19]

Benuzzi

[11] Patent Number: 5,257,900
[45] Date of Patent: Nov. 2, 1993

[54] APPARATUS FOR TURNING A PANEL OR A PANEL STACK ON THE WORKTABLE OF A CUTTING MACHINE

[75] Inventor: Piergiorgio Benuzzi, Bologna, Italy

[73] Assignee: Giben Impianti S.p.A., Pianoro, Italy

[21] Appl. No.: 742,418

[22] Filed: Aug. 8, 1991

[30] Foreign Application Priority Data

Aug. 8, 1990 [IT] Italy ............................ 12504 A/90

[51] Int. Cl.⁵ ............................................. B25J 11/00
[52] U.S. Cl. ...................................... 414/783; 414/753
[58] Field of Search ............... 414/754, 751, 781, 783, 414/782; 294/116, 88; 94/37, 14

[56] References Cited

U.S. PATENT DOCUMENTS

| | | | |
|---|---|---|---|
| 3,232,448 | 2/1966 | Browne et al. | 414/754 |
| 3,466,514 | 9/1969 | Brunner et al. | 414/754 |
| 3,884,363 | 5/1975 | Ajlouny | 414/751 |
| 4,274,801 | 6/1981 | Herb et al. | 414/751 |
| 4,547,115 | 10/1985 | Charbonn et al. | 414/783 |
| 5,133,256 | 7/1992 | Keaton | 414/781 |

FOREIGN PATENT DOCUMENTS 1268398 11/1986 U.S.S.R. ........................ 414/751

*Primary Examiner*—David H. Bollinger
*Assistant Examiner*—C. L. Wallace
*Attorney, Agent, or Firm*—Pollock, Vande Sande & Priddy

[57] ABSTRACT

Apparatus for turning by 90° a panel or a panel stack (P) on a cutting machine worktable (Q) comprises a withdrawable gripper means (1) rotatable about a vertical axis (2), which upon control clamps a panel stack (P) close to one of its rear corners. The gripper (1) is associated with a carriage (7) for causing the gripper (1) to perform in a programmable precise manner a rectilinear movement (3) near to, and away from the cutting line (Z) of the longitudinally cutting machine, such that the panel stack (P) will be turned in a clockwise or counter-clockwise direction, depending whether it is clamped at its left-hand or right-hand corner. A withdrawable push roller (4) acts on the panel stack (P) concurrently with the gripper by being moved parallel to the longitudinally cutting machine in a programmable precise manner, so that it assists in the desired turning of the panel stack (P).

6 Claims, 6 Drawing Sheets

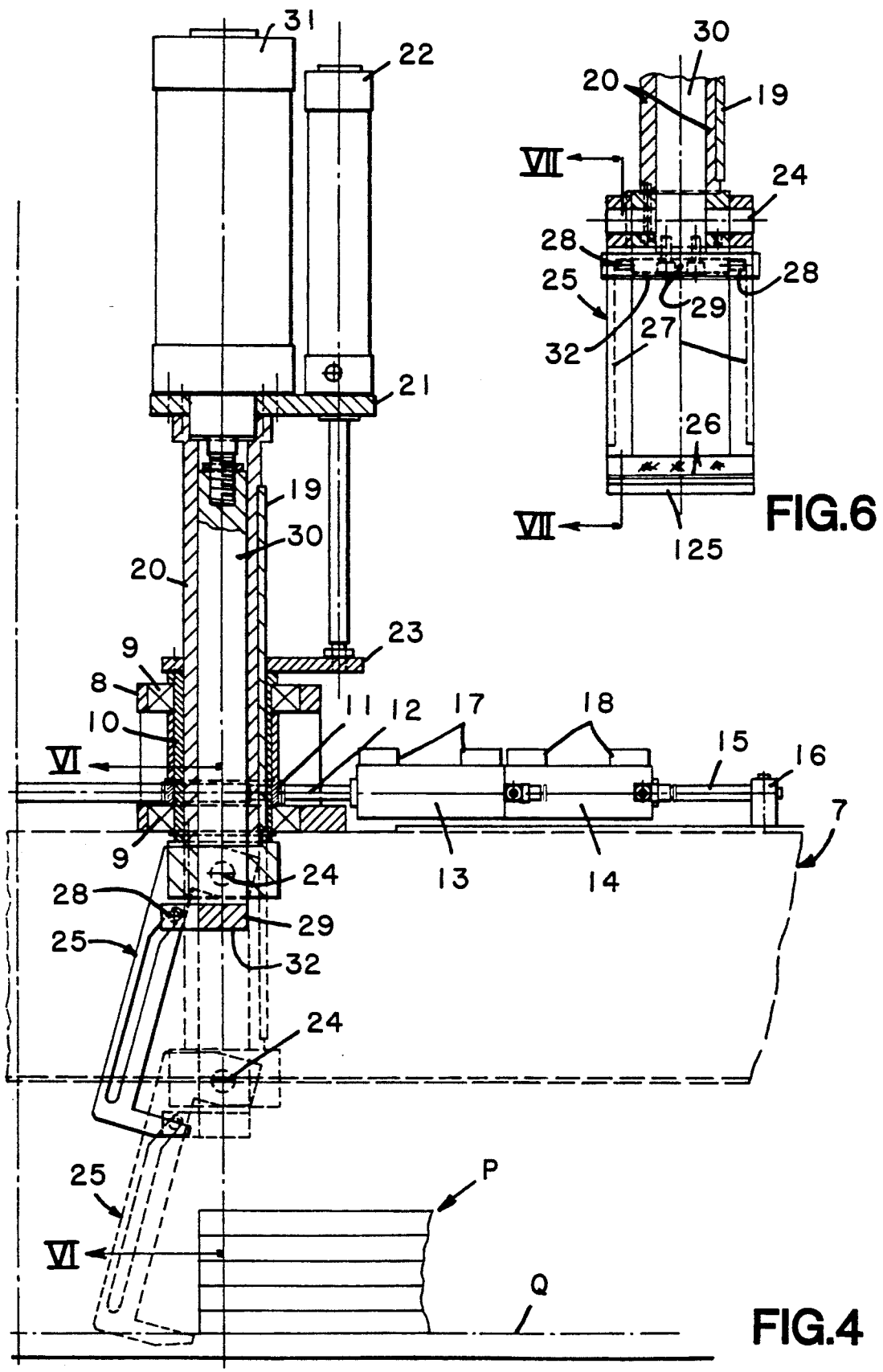

APPARATUS FOR TURNING A PANEL OR A PANEL STACK ON THE WORKTABLE OF A CUTTING MACHINE

BACKGROUND OF THE INVENTION

In a plant for cutting panels or panel stacks, it is known to provide upstream of the first machine in the plant, which is the longitudinally cutting machine, an apparatus for turning upon control a panel or a panel stack around a vertical axis, so that the same is differently arranged relative to the cutting line of the cutting machine, in order to carry out any cutting pattern by the so-called "precutting" operation.

In prior art panel- or panel stack-turning apparatus, the panel- or panel stack-supporting worktables occupy considerable floor space, and are of special construction.

SUMMARY OF THE INVENTION

The object of the invention is to provide an apparatus for turning panels or panel stacks on worktables having reduced overall dimensions, which can be made by conventional techniques.

This object is attained by the provision of an apparatus for turning by 90° a panel or a panel stack on the worktable of a cutting machine, particularly for a precutting operation and then a normal cutting operation to be performed on a panel or a panel stack, comprising:

a gripping means of the withdrawable type, which can be rotated around a vertical axis and upon control is caused to clamp a panel stack in the region of one of its rear corners, and which is associated with shifting means for programmable, precise shifts, whereby the gripping means is caused to perform a rectilinear movement near to and away from the cutting line of the longitudinally cutting machine, such that the panel stack will be turned in clockwise or counterclockwise direction, depending on the panel stack being clamped close to its left-hand corner or to its right-hand corner, and a pushing means of the withdrawable type, which is caused to act concurrently with the gripping means on a panel stack by being moved parallel to the longitudinally cutting machine in a programmable manner, so that it assists in the desired turning of the panel stack.

The arrangement is such that the floor space required by the worktable for supporting a panel stack as it is being turned by 90° is reduced, the worktable being made by conventional techniques, while its construction is not of a special type, in contrast to what is required in the known art.

BRIEF DESCRIPTION OF THE DRAWINGS

The features of the apparatus according to the invention, and the advantages arising therefrom, will clearly appear in the following specification of one preferred embodiment thereof, which is shown merely by way of example in the annexed drawing.

FIGS. 4 and 5 are side views, partly in section, of the gripping means for holding a panel stack while it is being turned, showing various operative and rest positions of the same.

FIG. 6 is a sectional view of the gripping means on line VI—VI in FIG. 4, and showing details of the same.

FIG. 7 is a sectional view of the gripping means, on line VII—VII in FIG. 6, and showing a further detail of the same.

DESCRIPTION OF PREFERRED EMBODIMENT

Figure 1:
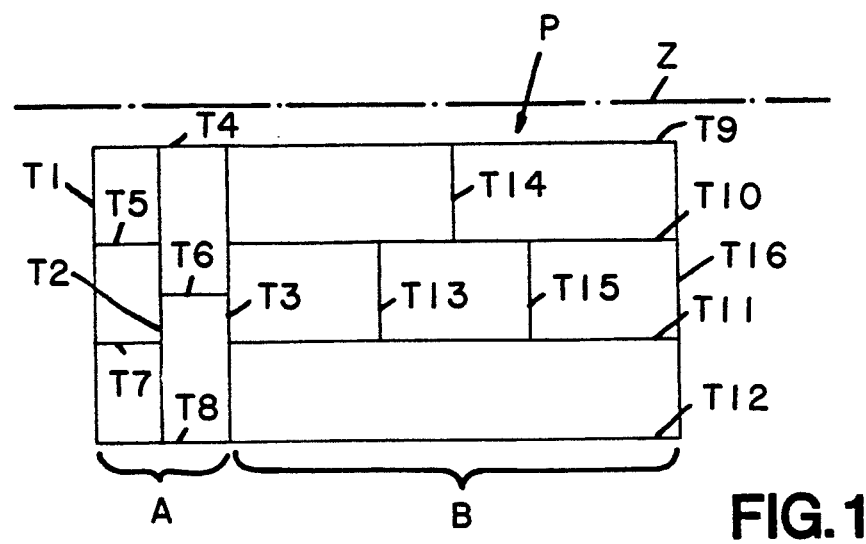
FIG. 1 is a plan view showing a possible panel-precutting pattern to be carried out on a panel stack.

In FIG. 1, reference P denotes a panel or a panel stack, and reference Z denotes the cutting line of the first longitudinally cutting machine in an angular cutting plant, by which the panel stack is to be cut, for example, according to the pattern shown in this figure. A panel stack P is usually placed on the worktable in front of the cutting line Z of the longitudinally cutting machine, with its long sides arranged parallel thereto.

In the prior art, a precutting operation on that part of a panel stack which is designated by reference A in FIG. 1 is carried out by causing the panel stack to be turned by 90° around a vertical axis, so that the panel stack short side associated with part A will be parallel to the cutting line Z of the first machine normally making longitudinal cuts. The panel stack, having been thus turned, is then advanced with programmed dwelling times to the cutting line Z of the said first machine by the pusher thereof, for the transverse trimming cut T1 and the cuts T2 and T3 to be made in part A. The just cut stacked panel strips will be then acted upon by the pusher or pushers of the second, normally transversely cutting machine, to the cutting line of which these strips are advanced for the longitudinal cuts T4, T5, T6, T7, T8 to be made in part A.

The panel stack part B left on the worktable of the first longitudinally cutting machine is turned by 90° and returned to the position shown in FIG. 1, so that part B will be then advanced to the cutting line Z of the first machine, for the longitudinal cuts T9, T10, T11, T12 to be made therein. By the second transversely cutting machine the transverse cuts T13, T14, T15, T16 will be made in the stacked panel strips resulting from cuts T9–T12.

The invention relates to an apparatus for a panel stack P to be subjected to the above-disclosed 90° panel-stack-turning steps.

Figure 2:
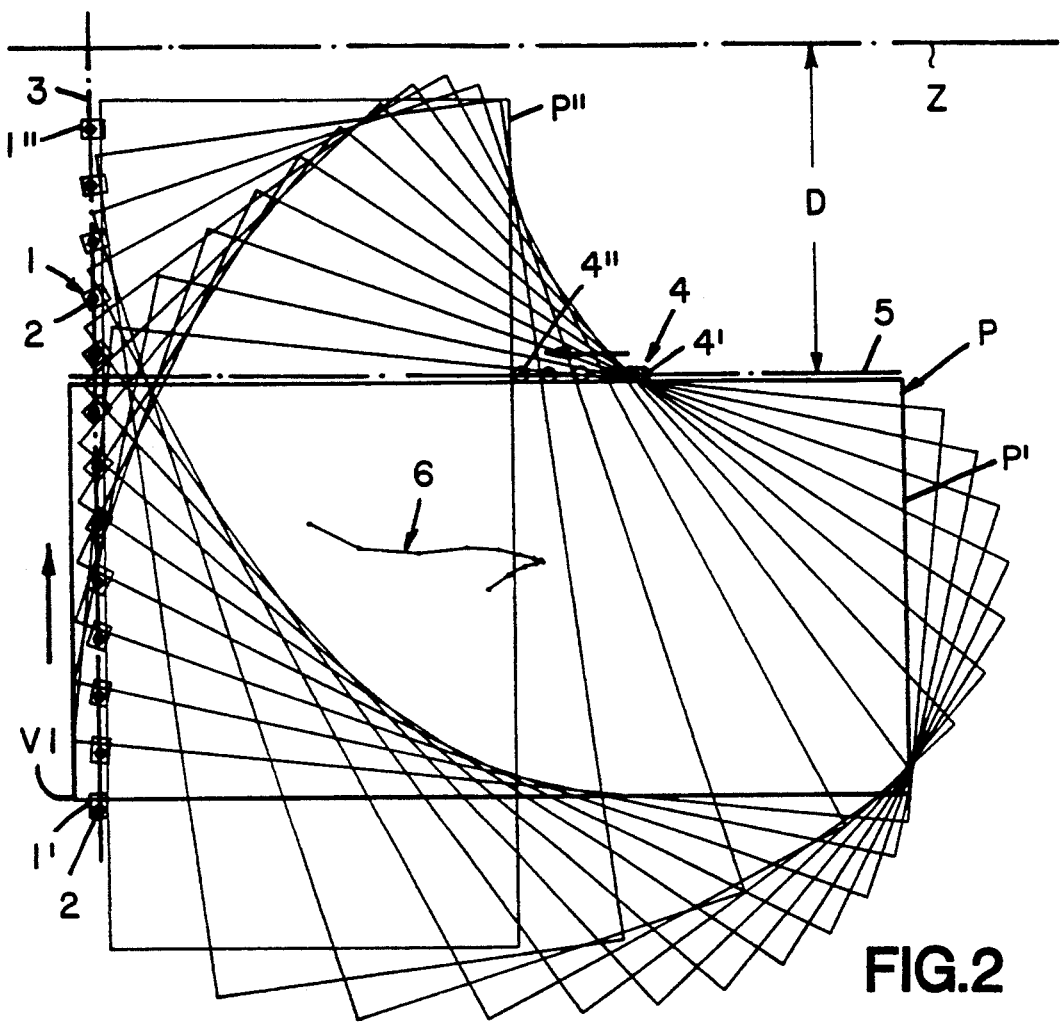
FIGS. 2 and 3 are plan views of a diagram illustrating how a panel stack is turned by the apparatus of the invention.

FIG. 2 shows that the panel stack-turning apparatus which comprises a gripping means 1 for clamping a panel stack P at a point on its perimeter, and which is rotatable around a vertical axis 2, and is shiftable near to and away from the cutting line Z of the longitudinally cutting machine, along the straight line 3 which is parallel to, and coincides with, or is at a short distance from the "zero" datum side of the longitudinally cutting machine worktable Q, i.e., the left-hand side in the shown example, in which respect the positioning of a panel stack remains the same regardless of panel stack sizes. Such shifting of the gripping means must be programmable as a function of the size of a panel pack P and, for this purpose, the gripping means 1 can be fitted with advantage on the carriage mounting the gripper members associated with the pusher of the first machine normally making longitudinal cuts at its cutting line z, which carriage is already provided with motor means for programmable precise shifts to be effected. The gripping means 1 is operated by servo controls, by which it is rotated about its axis 2 so as to be properly oriented for correctly clamping a panel stack during the panel stack-turning steps, and is vertically shifted along the axis so as to be moved from an uplifted position in which it is prevented from interfering with a panel stack, into a lowered position in which it is caused to cooperate with a panel stack.

Jointly with the gripping means 1, the panel stack-turning apparatus of the invention comprises a pushing means preferably in form of a freely rotatable, vertical axis roller 4, which upon control can be lifted from the worktable Q supporting a panel stack P, up to a level at least equal to the thickness thereof, and which must be withdrawable under the worktable to prevent it from interfering with a panel stack. This pushing roller is fitted on a carriage which is movable along a line 5 parallel to the cutting line Z of the longitudinally cutting machine, and at a proper distance D therefrom.

The worktable Q supporting a panel stack P is formed at the line 5 along which the pushing roller 4 is moved, with an elongated rectilinear aperture parallel to the cutting line Z of the longitudinally cutting machine, and suitable wide to enable the roller 4 to run therein. The panel stack-supporting worktable Q may be of any known construction and may be, for example, of the modular type.

The apparatus is operated as follows.

A panel stack P is first placed on the worktable of the longitudinally cutting machine, in front of its cutting line Z, and is positioned as shown by P′ in FIG. 2. The forward long side of the panel stack is arranged upstream of, and at a short distance from the elongated aperture 5 in which the pushing roller 4 is caused to run, the roller being moved to position 4′ and being lifted up before the panel stack.

The uplifted gripping means 1 is moved behind panel stack P, into the position shown by 1′, and is then lowered and caused to clamp the panel stack by its rear long side, close to the corner V1 thereof. Next, the lowered down gripping means is advanced toward the cutting line Z of the longitudinally cutting machine and is caused to reach the position 1″, and the uplifted pushing roller 4 is shifted in timed relation from the position 4′ to the position 4″. Thus, the panel stack P is turned by 90° so that from position P′ it is moved into position P″, as required for a pre-cutting operation to be performed in its part A. The broken line 6 shows how the barycenter of the panel stack is being displaced while the panel stack is being turned. With the gripping and pushing means 1 and 4 being moved in an electronically controlled precise manner, the panel stack can be turned exactly 90°.

Once the panel stack has been thus turned, the gripping means 1 and the pushing roller 4 are mutually neutralized, and the stacked panels may be driven against one or more, stacked panels line-up means of the retractable type on the left-hand side, for example by the pushing roller 4, and optionally by another roller mounted on its own moving means, by which this other roller is moved parallel to the line 5. With the stacked panels being lined up, a somewhat generous tolerance can be allowed in the 90° turning of the panel stack, with the advantages resulting from such a linedup condition of the stacked panels.

After the stacked panels have been turned and perhaps lined up, they are acted upon by the gripper members associated with the pusher of the first, normally longitudinally cutting machine, and are advanced to the cutting line Z thereof for the transverse cuts T1, T2, T3 to be made in its part A, as explained above with reference to FIG. 1.

Figure 3:
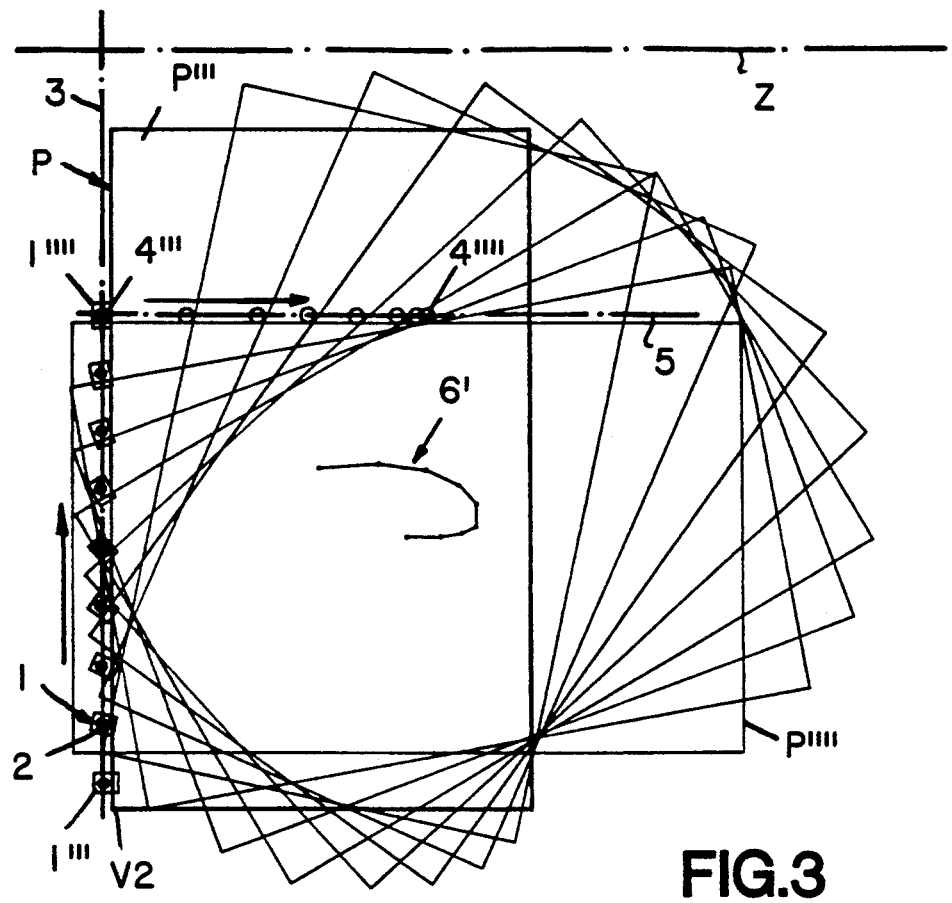
Figure 8:
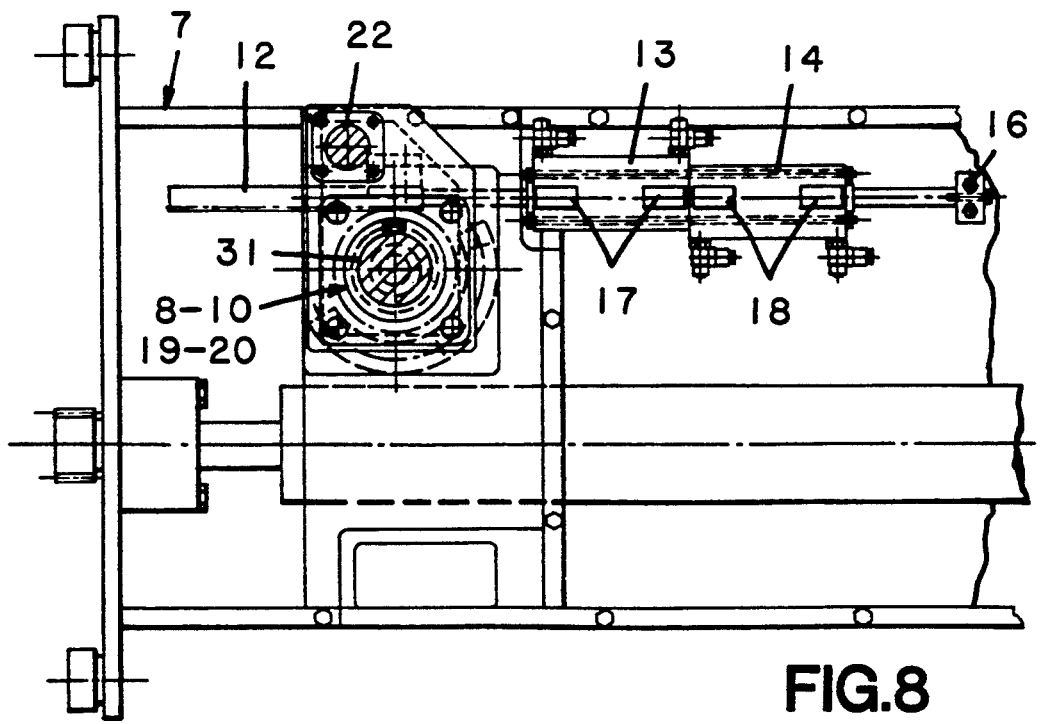
FIG. 8 is a top plan view of the gripping means fitted on the pusher carriage of the longitudinally cutting machine.

After the pre-cutting operation on the panel stack part A has been completed by the second cutting machine, the remaining panel stack part B (FIG. 1) is moved backward into position P‴ shown in FIG. 3. The pusher associated with the first machine making longitudinal cuts at its cutting line Z now drives the gripping means 1 into position 1‴, permitting the gripping means to clamp the remaining panel stack part B by its one long side, close to the corner V2.

At this time, the pushing roller 4 is located in position 4‴, and is uplifted.

In timed relation, while the gripping means 1 is being drawn near to the cutting line Z of the longitudinally cutting machine, so that the gripping means will be transferred from position 1‴ to position 1⁗, the uplifted pushing roller 4 is being moved from position 4‴ into position 4⁗, whereby the panel stack part B will be turned in clockwise direction by 90°, and will be positioned at P⁗.

The pushing roller 4 is then lowered, the gripping means 1 opened and lifted up, and the part B of the panel stack P, which may be pushed against the line-up means on the left-hand side, is advanced to the cutting line Z of the longitudinally cutting machine, for the longitudinal cuts T9–T12 to be made therein.

In FIG. 3, the broken line 6′ shows the displacement of the barycenter of the part B of panel stack P, while this part is being lastly turned by 90°.

FIGS. 4 to 8 show an embodiment of the gripping means 1.

A support 8 is fixedly connected to the upper part of the pusher carriage 7 of the first machine normally making longitudinal cuts at its cutting line Z, and a bushing 10 with its axis vertically arranged is rotatably carried by support 8 through bearings 9. Coaxially keyed to the outside of the bushing is a crown gear 11 which meshes with a rack 12 driven by a cylinder-and-piston unit 13 coaxially fastened by its rear end side to the fore end side of a further cylinder-and-piston unit 14, whose stem 15 is fixedly connected at 16 to the pusher carriage 7. Magnetic sensors 17 and 18 detect the end-of-stroke positions of the pistons of units 13 and 14, which are pneumatically operated.

The bushing 10 is formed with a longitudinal slot engaged by a key 19 for a tube 20 to be slidably guided thereby in the bushing. At its upper end, tube 20 carries a projecting plate 21 integral therewith, which plate is fastened to the body of a cylinder-and-piston unit 22, with its stem vertically directed downward, and fastened to a plate 23 integral with the upper end of bushing 10. The to-and-fro vertical stroke of the stem of the cylinder-and-piston unit 22 causes tube 20 to be raised and lowered.

Pivotally connected at 24 to the lower end of tube 20 are the upper ends of the transversally arranged jaw member 25 of the gripping means 1, which in front view has a "U"-shaped configuration as shown in FIG. 6, while in side view it has an ∼L∼-shaped configuration, as shown in FIG. 4.

Resilient material 26 covers the inward flat face of the foot 125 of jaw member 25.

The legs of jaw member 25 of the gripping means 1 have respective slots 27 formed in their inward sides, with an inclined uppermost section 127 and the rest extending straight along the longitudinal axis of the legs. Cooperating with the slots 27 are two pins 28 facing in opposite positions, carried by a crosspiece 29 fixedly connected to the lower end of a stem 30 which is axially slidably fitted in tube 20, and is fastened to the stem of a cylinder-and-piston unit 31 whose body is fastened to the plate 21. This crosspiece 29 constitutes the other jaw member of the gripping means, and has a flat downward face provided with a covering 32 of resilient material.

When the gripping means 1 is in rest position, its jaw members 25 and 29 are in their raised position, as shown in solid lines in FIG. 4. The pins 28 cooperate with the inclined uppermost section 127 of slots 27, and the foot of the raised jaw member 25 is laterally offset from the projection in plan view of the upper jaw member 29.

When the gripping means 1 is to be set in operation, its raised jaw member 25 is first correctly positioned by the actuated cylinder-and-piston units 13, 14, in respect of a panel stack P to be clamped thereby. Then the tube 20 is lowered upon control by the stem of the actuated cylinder-and-piston unit 22 being retracted. The gripping means jaw member 25, held in open position, is thus moved down into the position shown in dash-and-dot lines in FIG. 4. In automatic phase succession, upper jaw member 29 is lowered and, according to the operative sequence shown in FIG. 5, before the jaw member 29 having been moved into contact with a panel stack P, this jaw member moves the pins 28 into cooperation with the straight section of slots 27, causing a swinging movement of the jaw member 25 which results in its foot 125 being slipped by its active part 26 under the panel stack P, however without the same being allowed to interfere therewith. As soon as the upper jaw member 29-32 has been caused to contact the panel stack, by reaction the lower jaw member foot 125-26 is raised thereby, so that the panel stack is firmly clamped by the gripping means. The gripping means is made to correspond to the height dimension of the panel stack without lifting the same, in that the cylinder-and-piston unit 22 is set in its inoperative condition, or is in a condition in which it reacts in a resilient manner.

Figures 5, 7:
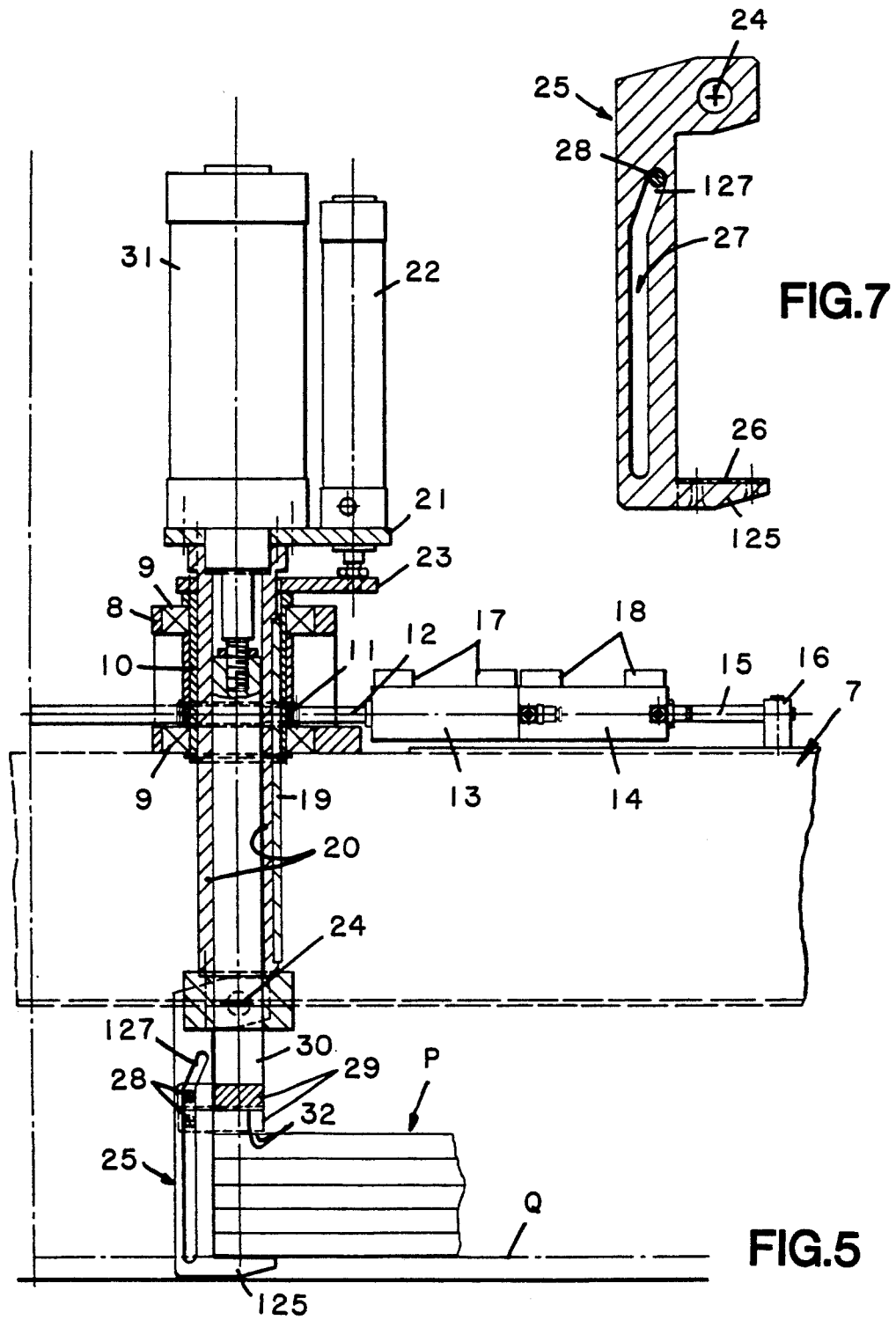

The jaw member 25 can be so provided and/or positioned relative to a panel stack P that it will either contact the panel stack at one of its endsides, as shown in FIG. 5, or remain out of contact therewith.

In the reverse step by which the gripping means will be neutralized, the cylinder-and-piston unit 22 is set in operative condition, so that the upper jaw member is first moved into its raised position, and the lower jaw member is then swung away from a panel stack by the upper jaw member. The gripping means, having been thus arranged in open position, is raised.

The worktable Q supporting a panel stack P is so arranged that the panel stack edge portion lying over the line 3, along which the gripping means 1 is moved, is left in such a free condition that it does not interfere with the gripping means when the same is run through its active travel.

Figure 9:
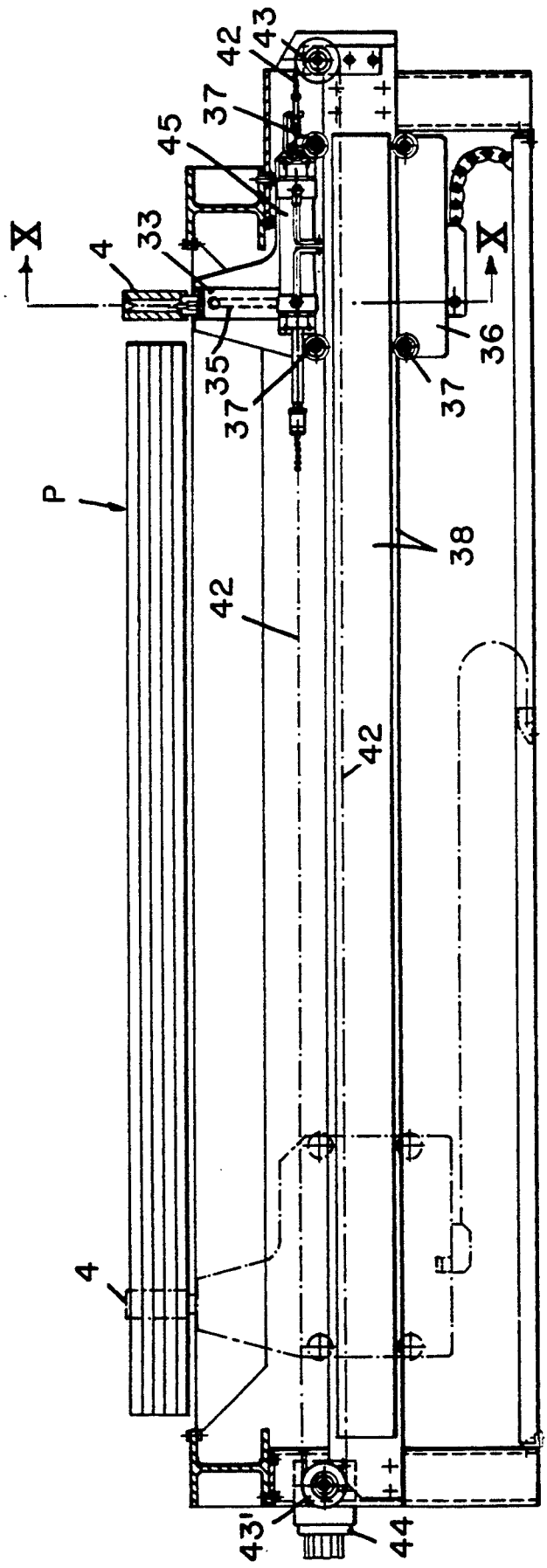
FIG. 9 is a side view of the downwardly withdrawable pushing means which jointly with the gripping means causes a panel stack to be turned.
Figure 10:
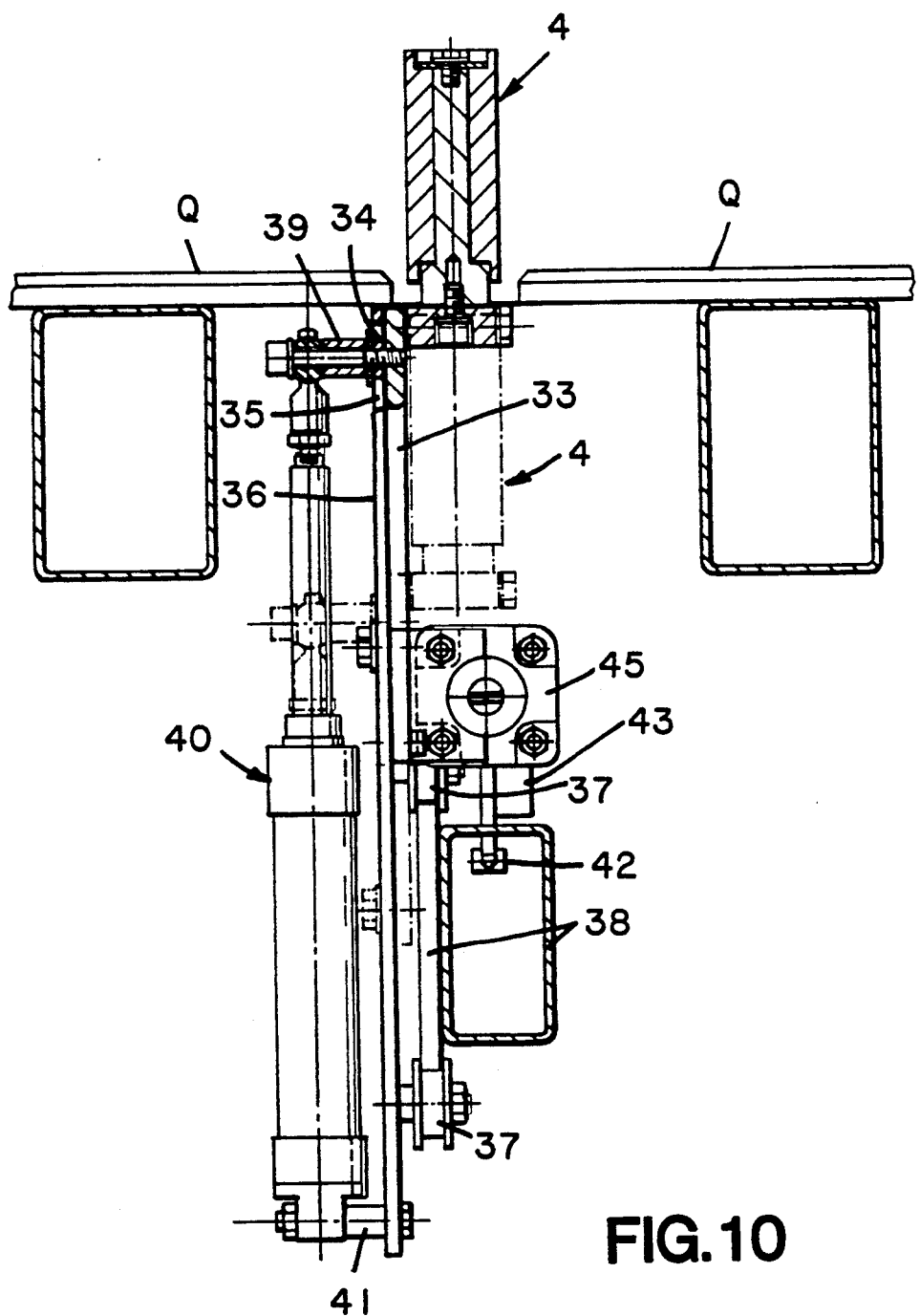
FIG. 10 is a view with parts in cross-section of the pushing means taken on line X—X of FIG. 9, and showing some details of the same.

FIGS. 9 and 10 show an embodiment of the pushing roller 4 which is operated along the longitudinally cutting machine worktable, and is withdrawable thereunder. As illustrated, roller 4 is vertically and freely rotatably fitted on a slide 33 which, by means of rollers 34, is caused to slide in a slot 35 vertically formed in a carriage 36 constituted by a plate arranged in upright position, with grooved wheels 37 being mounted on one of its sides so as to project therefrom, and running on a fixed straight guide 38 arranged in an underlying parallel relation with the elongated aperture 5 in the worktable Q, through which the pushing roller is raised, to be disposed in operative condition. Through an extension 39 secured to the spindle of one of these rollers 34, the slide 33 is connected to the stem of a pneumatically operated cylinder-and piston unit 40 whose body is anchored at 41 to the plate-like carriage 36. Upon actuation of the cylinder-and-piston unit, the pushing roller 4 is moved from its operative position into its rest position, and vice-versa (shown in FIG. 10 respectively in solid lines and in dash-and-dot lines).

With the interposition of at least one shock absorber, the carriage 36 is connected to the ends of a toothed belt or chain 42 led over horizontal axis sprockets 43, 43', one of which is driven by a unit 44 with an electronically controlled motor. Provisions may be made for the ends of chain 42 to be connected to the double stem of a pneumatically operated cylinder unit 45 whose body is fastened to the carriage 36. Thanks to the provision of this unit, carriage 36 can be imparted any movements with a resilient character, independently of the above-disclosed, programmed precise shifts by the aforementioned motor means, which are, for example, useful when the roller 4 has to be used as a means to arrange stacked panels against laterally located line-up means.

The gripping means 1 may be mounted on its own carriage movable along its own guide, or along one of the guides for the pusher carriage of the longitudinally cutting machine, and driven by its own drive means. Such a modification permits the elimination of deadheading in the return of the carriage to the rear side of a panel stack, after the panel stack has been turned as shown in FIG. 2, for a pre-cutting operation to be performed thereon. Further modifications may relate to the shape of the gripping means, or to the use of a blade-like pushing means in place of the pushing roller 4.

I claim:

1. An apparatus for turning at least one panel on a worktable of a cutting machine for a cutting operation, comprising
    (a) withdrawable gripping means (1), means for rotating said gripping means about a vertical axis (2), and control means for causing said gripping means to clamp a panel (P) adjacent a rear corner of said panel, said gripping means being associated with shifting means (7) for effecting programmable, precise shifts, whereby said gripping means is caused to perform a rectilinear movement (3) near to, and away from a cutting line of said cutting machine, such that said panel will be turned selectively in a clockwise direction and a counterclockwise direction, depending on whether said panel is clamped adjacent to its left-hand corner or to its right-hand corner; and
    (b) a withdrawable pushing means (4) acting on said panel concurrently with said gripping means (1), to move said panel parallel to said cutting machine in a programmable manner, thereby assisting in turning of said panel;
    (c) said gripping means (1) comprising one jaw member (25) "L"-shaped in side view, upper ends of said one jaw member being pivotally connected horizontally to a lower end of a vertically arranged tube (20) axially slidable in a bushing (10) to which said tube is keyed, said bushing being rotatable about its axis by a support (8) fixedly connected to an upper part of said shifting means comprising a pusher carriage (7), and a plate (21) being attached to and projecting from an upper end of said tube, a body of a vertically arranged, pneumatically operated cylinder-and-piston unit (22) being fastened to said plate (21), while a downwardly directed stem of said cylinder-and-piston unit (22) is connected to a plate (23) which is attached to an upper end of said bushing (10) so as to project therefrom, a stem (30) being so provided as to be axially slidable in said tube and being connected by an upper end of said stem, a stem of a pneumatically operated cylinder-and-piston unit (31) having a body fastened to the plate (21) at the upper end of said tube, said axially slidable stem (30) carrying at a lower end thereof an upper, flat, second jaw member (29) of said gripping means, fitted with pins (28) in ends of a side extension thereof, said pins being slidable in longitudinal slots (27) formed in either inward sides of said "L"-shaped lower jaw member (25) and each having an inclined uppermost section (127) which, when engaged by said pins, causes said lower jaw member to take an inclined position, so that a lower part (125) thereof will be set off the projection in plan view of said upper jaw member, and with said lower jaw member in said inclined position, said gripping means lower jaw member will be lowered, and said gripping means upper jaw member will be subsequently lowered under control, whereby, owing to said pins being moved downward by said upper jaw member during a first part of its downward travel, so as to be caused to cooperate with a straight section of said slots (27), swinging movement of said lower jaw member is promoted, and said lower part (125) will be slipped under a said panel without interfering with said panel, and as soon as said upper jaw member has completed its downward travel by contacting said panel, by reaction said lower jaw member will be raised by said upper jaw member, causing said panel to be clamped by said gripping means.

2. The apparatus according to claim 1, wherein said gripping means (1) for turning a panel stack, is fitted on the longitudinally cutting machine pusher carriage (7) which is normally operated so as to be moved in a programmable precise manner, provisions being made for the gripping means to be neutralizable or settable in operative condition as needed for example by being lifted up or lowered down, the gripping means being fitted on the said carriage, so as to be rotatable around its vertical axis (2), under the control of means (11, 12, 13, 14) for rotating the same, which upon control will correctly position the gripping means in the round angle, so that the gripping means will be suitably oriented either for the first or the second panel stack-turning step to be performed, as required respectively for a panel stack pre-cutting operation, and for the remaining panel stack part (B) to be returned into the condition of its former arrangement relative to the cutting line (Z) of the longitudinally cutting machine.

3. The apparatus according to claim 1, comprising programmable control means for causing the gripping means (1) to clamp a panel stack by its rear long side close to the corner (V1) thereof, so that in the first panel stack-turning step, the panel stack will be turned by 90° around a vertical axis, and will be thus arranged with its long sides perpendicular to the cutting line (Z) of the longitudinally cutting machine, the said corner (V1) coinciding with, or being near to the longitudinally cutting machine worktable "zero" datum side, in which respect the positioning of a panel stack remains always the same with any different panel stack sizes, provisions being made on starting the said first panel stack-turning step, for the pushing means (4) to be positioned before the panel stack fore long side, at an intermediary point thereof, so that in phased relation with the gripping means being shifted, the said pushing means (4) is being moved near to the line (3) along which the said gripping means is being shifted, until the panel stack long sides have been turned by 90°.

4. The apparatus according to claim 1, comprising programmable and control means for causing the gripping means (1) to clamp the panel stack by its one long side that is turned toward the cutting machine worktable "zero" datum side, close to the corner (V2) between this one panel stack long side and the panel stack rear short side, so that in the second panel-stack turning step a panel stack will be turned by 90° around a vertical axis, and will be thus re-arranged in its former condition relative to the cutting line (Z) of the longitudinally cutting machine, the pushing means (4) being located, at the beginning of this second panel stack-turning step, close to, and at an intermediary point of the said one panel stack long side that is acted upon by the gripping means, and being moved upon control away from the line (3) along which the gripping means is being motivated, until the said one panel stack long side has been turned by 90°.

5. The apparatus according to claim 1, wherein the bushing (10) rotatably supporting the gripping means (1) for clamping a panel stack, is fitted with a crown gear (11) which is keyed to the outside of said bushing, and is in mesh with a rack (12) driven by the pneumatically operated cylinder-and-piston units (13, 14), by which the gripping means can be differently arranged in the round angle, so as to be caused to correctly clamp a panel stack before the two successive panel stack-turning steps.

6. An apparatus for turning at least one panel on a worktable of a cutting machine for a cutting operation, comprising
(a) withdrawable gripping means (1), means for rotating said gripping means about a vertical axis (2), and control means for causing said gripping means to clamp a panel (P) adjacent a rear corner of said panel, said gripping means being associated with shifting means (7) for effecting programmable, precise shifts, whereby said gripping means is caused to perform a rectilinear movement (3) near to and away from a cutting line of said cutting machine, such that said panel will be turned selectively in a clockwise direction and a counterclockwise direction, depending on whether said panel is clamped adjacent to its left-hand corner or to its right-hand corner; and
(b) a withdrawable pushing means (4) acting on said panel concurrently with said gripping means (1), to move said panel parallel to said cutting machine in a programmable manner, thereby assisting in turning of said panel;

(c) said pushing means (4) being constituted by a roller (4) which, jointly with said gripping means (1), acts on a panel to be turned, is vertically and freely rotatably fitted, so as to be liftable and lowerable by means of a cylinder-and-piston unit (40), on a slide (33) which is mounted on a carriage (36) slidable on a horizontal guide (38) located under said worktable, and in parallel relation with a line (5) along which said pushing roller is driven, said carriage being operated in a precise manner through a positive motion transmission drive (42, 43, 43') by electronically controlled geared motor means (44).

* * * * *